US012375789B2

(12) United States Patent
Liu et al.

(10) Patent No.: US 12,375,789 B2
(45) Date of Patent: Jul. 29, 2025

(54) VEHICLE-MOUNTED ELECTRONIC DEVICE AND VEHICLE

(71) Applicant: Shenzhen Yinwang Intelligent Technologies Co., Ltd., Shenzhen (CN)

(72) Inventors: Teng Liu, Shanghai (CN); Xubiao Gong, Shanghai (CN); Guodong Zhang, Shanghai (CN); Mufei Li, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/446,807

(22) Filed: Aug. 9, 2023

(65) Prior Publication Data

US 2023/0388613 A1 Nov. 30, 2023

Related U.S. Application Data

(63) Continuation of application No. PCT/CN2021/133984, filed on Nov. 29, 2021.

(30) Foreign Application Priority Data

Feb. 10, 2021 (CN) .......................... 202110185651.2

(51) Int. Cl.
*H04N 23/54* (2023.01)
*H04N 23/53* (2023.01)
*H04N 23/62* (2023.01)
*H04N 23/695* (2023.01)

(52) U.S. Cl.
CPC ........... *H04N 23/54* (2023.01); *H04N 23/531* (2023.01); *H04N 23/62* (2023.01); *H04N 23/695* (2023.01)

(58) Field of Classification Search
None
See application file for complete search history.

(56) References Cited

U.S. PATENT DOCUMENTS

| | | | | |
|---|---|---|---|---|
| 10,011,230 | B1 * | 7/2018 | Brown | H04N 23/698 |
| 12,028,605 | B2 * | 7/2024 | Shi | H04N 23/62 |
| 12,088,920 | B2 * | 9/2024 | Kim | G06V 20/52 |
| 2008/0198039 | A1 * | 8/2008 | Philiben | G08G 5/53 340/961 |
| 2010/0149332 | A1 | 6/2010 | Wang | |
| 2014/0132527 | A1 * | 5/2014 | Wu | H04N 23/631 345/173 |
| 2015/0281577 | A1 * | 10/2015 | Ruben | H04N 1/00244 348/220.1 |
| 2015/0334307 | A1 * | 11/2015 | Thurairatnam | H04N 23/62 348/333.01 |

(Continued)

FOREIGN PATENT DOCUMENTS

| | | | |
|---|---|---|---|
| CN | 203301641 | U * | 11/2013 |
| CN | 105872383 | A * | 8/2016 |

(Continued)

*Primary Examiner* — Ricky Chin

(74) *Attorney, Agent, or Firm* — Conley Rose, P.C.

(57) ABSTRACT

A vehicle-mounted electronic device includes a first housing; one or more camera modules; a lifting drive mechanism configured to drive the one or more camera modules to be lifted up and down inside or outside the first housing; and a rotation drive mechanism configured to drive the one or more camera modules to rotate.

20 Claims, 15 Drawing Sheets

(56) References Cited

U.S. PATENT DOCUMENTS

| | | | |
|---|---|---|---|
| 2017/0244902 A1* | 8/2017 | DiMenichi | H04N 23/50 |
| 2018/0334262 A1* | 11/2018 | Descheemaeker | B64D 45/00 |
| 2019/0195998 A1* | 6/2019 | Campbell | G01S 13/426 |
| 2019/0210436 A1* | 7/2019 | Frederick | B60J 7/043 |
| 2021/0208488 A1* | 7/2021 | Qian | F16M 13/00 |
| 2021/0237694 A1* | 8/2021 | Hirschvogel | B60J 7/16 |
| 2022/0032858 A1* | 2/2022 | LaCross | H04N 23/50 |
| 2023/0262326 A1* | 8/2023 | Shi | H04N 23/62 |
| | | | 348/36 |
| 2023/0388613 A1* | 11/2023 | Liu | H04N 23/531 |
| 2023/0388629 A1* | 11/2023 | Chen | H04N 23/90 |
| 2024/0272280 A1* | 8/2024 | Adams | B08B 5/02 |

FOREIGN PATENT DOCUMENTS

| | | | | |
|---|---|---|---|---|
| CN | 106791635 A | * | 5/2017 | |
| CN | 108284799 A | * | 7/2018 | B60R 11/04 |
| CN | 208285447 U | * | 12/2018 | |
| CN | 110034518 A | * | 7/2019 | |
| CN | 110047170 A | * | 7/2019 | |
| CN | 210225571 U | | 3/2020 | |
| CN | 210284127 U | * | 4/2020 | |
| CN | 112874300 A | * | 6/2021 | |
| CN | 213974167 U | * | 8/2021 | |
| CN | 214295727 U | * | 9/2021 | |
| CN | 114940180 A | * | 8/2022 | B60R 11/04 |
| DE | 3900667 A1 | | 7/1990 | |
| FR | 3023231 A1 | * | 1/2016 | B60K 37/02 |
| KR | 101705704 B1 | * | 2/2017 | |
| KR | 101894571 B1 | * | 9/2018 | |
| KR | 102002519 B1 | * | 7/2019 | |
| KR | 102012705 B1 | * | 8/2019 | |
| KR | 102035045 B1 | * | 10/2019 | |
| KR | 102089421 B1 | * | 3/2020 | |
| WO | WO-2019105679 A1 | * | 6/2019 | B60K 35/00 |

* cited by examiner

VEHICLE-MOUNTED ELECTRONIC DEVICE AND VEHICLE

CROSS-REFERENCE TO RELATED APPLICATIONS

This is a continuation of Int'l Patent App. No. PCT/CN2021/133984 filed on Nov. 29, 2021, which claims priority to Chinese Patent App. No. 202110185651.2 filed on Feb. 10, 2021, both of which are incorporated by reference.

FIELD

This disclosure relates to a vehicle-mounted electronic device and a vehicle.

BACKGROUND

With the evolution of electric, intelligent, and networked automobiles, an increasing quantity of sensing and communication units, such as a camera module, a microphone, and a Bluetooth module, are mounted on a vehicle, to meet requirements of a passenger in a plurality of scenarios. However, these sensing and communication units are usually distributed at different positions in the vehicle, and are mounted in a fastened manner. This increases mounting costs and difficulties, and affects implementation of functions of the vehicle. For example, a camera module is mounted at an A-pillar position to monitor a status of a driver, and a photographing camera module is mounted at a rearview mirror position to photograph an interior of a cockpit. However, a passenger in the vehicle usually cannot physically close the camera module when the passenger does not want to use the camera module for privacy reasons. In addition, a position and an angle of the camera module are fixed. Consequently, requirements in a plurality of photographing scenarios and requirements for improving photographing quality are hard to meet.

It can be learned that, currently, a vehicle-mounted electronic device is urgently needed, to implement functions of a plurality of sensing and communication units and reduce system costs.

SUMMARY

In view of this, an objective of this disclosure is to provide a vehicle-mounted electronic device and a vehicle that enable a camera module to meet more functional requirements and appropriately reduce manufacturing costs.

To achieve the foregoing objective, a first aspect provides a vehicle-mounted electronic device, including a first housing; one or more camera modules; a lifting drive mechanism configured to drive the one or more camera modules to be lifted up and down inside or outside the first housing; and a rotation drive mechanism configured to drive the one or more camera modules to rotate.

The vehicle-mounted electronic device described above is adopted. When the camera module is not used, the camera module may be driven down by the lifting drive mechanism. This reliably protects privacy. In addition, the rotation drive mechanism drives the camera module to rotate, to adapt to more scenarios and requirements. For example, an optimal scenario in a case of group photographing and a case of single-person photographing is considered. A same camera module may photograph both interior space of a vehicle and exterior space of a vehicle through rotation adjustment. In addition, because the camera module is rotated to adapt to more scenarios and function requirements, an increase in a quantity of camera modules can be suppressed, and an increase in manufacturing costs can be suppressed.

In a possible implementation of the first aspect, the lifting drive mechanism and/or the rotation drive mechanism are/is configured to execute driving in response to an instruction of a man-machine interface.

The foregoing structure is adopted. The camera module is driven according to an instruction from a passenger, so that various requirements of the passenger can be adapted.

In a possible implementation of the first aspect, the man-machine interface includes at least one of a voice interface, a touch interface, and a sensing interface.

In a possible implementation of the first aspect, the lifting mechanism drives each of a plurality of camera modules to be independently lifted up and down inside or outside the first housing. The rotation drive mechanism drives each of the plurality of camera modules to independently rotate.

The foregoing structure is adopted. Because each camera module is independently lifted up and down or rotated, more scenarios and requirements can be adapted.

In a possible implementation of the first aspect, the vehicle-mounted electronic device further includes a display unit and a second housing, where the display unit is mounted on the second housing.

In a possible implementation of the first aspect, the vehicle-mounted electronic device further includes a microphone unit, where the microphone unit includes a plurality of microphones, and the plurality of microphones are arranged along an edge of the second housing.

The foregoing structure is adopted. The microphone unit may be used to detect a position of a speaker, and the camera module may be controlled to photograph the speaker. In addition, since the plurality of microphones are arranged along the edge of the second housing, the position of the speaker can be easily recognized by using a microphone array.

In a possible implementation of the first aspect, the vehicle-mounted electronic device further includes a millimeter wave radar, and the millimeter wave radar is used for liveness detection or gesture recognition.

The foregoing structure is adopted. The millimeter wave radar may be used for gesture recognition or liveness detection. The gesture recognition means that, for example, a gesture motion of a driver is detected by the millimeter wave radar, so that the driver can operate a vehicle by space touching. The liveness detection means that, for example, whether there is a child, a drunk person, and the like in a vehicle may be detected, to avoid the child, the drunk person, and the like in the vehicle from being forgotten.

In a possible implementation of the first aspect, the vehicle-mounted electronic device further includes a near field communication unit. The near field communication unit is configured to enable the vehicle-mounted electronic device to communicate with a mobile terminal.

The foregoing structure is adopted. Because the near field communication unit is integrated in the vehicle-mounted electronic device, a function of performing near field communication between the vehicle-mounted electronic device and another terminal device may be implemented by using the near field communication unit. For example, information received by a mobile phone may be sent to the display unit by using the near field communication unit for display. Alternatively, position information (for example, a position selected by a mobile phone user on a map display picture) of a mobile phone is sent to a vehicle side for navigation. Alternatively, a navigation picture of a mobile phone is synchronously transmitted to the display unit of the vehicle-mounted electronic device for display.

In a possible implementation of the first aspect, the vehicle-mounted electronic device further includes an optical proximity sensor, and the optical proximity sensor is configured to detect luminance in a cockpit.

The foregoing structure is adopted. Corresponding control is performed on luminance that is inside a passenger compartment and that is sensed by the optical proximity sensor, for example, luminance of a display picture of the display unit of the vehicle-mounted electronic device is controlled.

In a possible implementation of the first aspect, the vehicle-mounted electronic device further includes a haptic feedback unit, and the haptic feedback unit is configured to generate haptic feedback for a touch operation.

The foregoing structure is adopted. The haptic feedback unit provides haptic feedback when a passenger performs the touch operation on an operation interface displayed on the display unit, to prompt the passenger whether the passenger actually performs the corresponding touch operation.

In a possible implementation of the first aspect, the camera module includes a first camera module and a second camera module. The first camera module is a color camera module, and the second camera module is a depth camera module.

The foregoing structure is adopted. The first camera module may perform photographing and a video call, and the second camera module may perform facial recognition and gesture motion recognition, monitor a fatigue state of a driver, and the like, so that the vehicle-mounted electronic device can adapt to more scenarios and requirements.

In a possible implementation of the first aspect, the vehicle-mounted electronic device further includes the display unit and the second housing that is configured to mount the display unit. The first housing is detachably mounted on the second housing.

The foregoing structure is adopted. Because the first housing of the camera module is detachably mounted on the second housing, during upgrade, for example, when a pixel of the camera module is increased, a field of view is increased, and an appearance model is optimized, quick disassembly and upgrade can be implemented. This ensures consumer experience.

In addition, to achieve the foregoing objective, a second aspect provides a vehicle, and the vehicle includes the vehicle-mounted electronic device in any structure in the first aspect. The vehicle-mounted electronic device may be a central display screen of the vehicle.

BRIEF DESCRIPTION OF THE DRAWINGS

The following further describes features of this disclosure and a relationship between the features with reference to accompanying drawings. The accompanying drawings are all examples. Some features are not shown in an actual scale. In addition, common features in a field involved in this disclosure and unnecessary to this disclosure may be omitted in some accompanying drawings, or features unnecessary to this disclosure may be additionally shown. A combination of features shown in the accompanying drawings is not intended to limit this disclosure. In addition, same reference numerals refer to same content throughout the specification. Specific description of the accompanying drawings is described as follows.

DESCRIPTION OF REFERENCE NUMERALS

100: vehicle-mounted electronic device; 10: main housing; 11: main part; 12: front cover plate; 13: fastening plate; 14: microphone cover plate; 20: display unit; 30: control unit; 40: photographing unit; 41: photographing unit housing; 42, 42L, and 42R: camera modules; 50: microphone unit; 62: NFC unit; 66: haptic feedback unit; 80, 80L, and 80R: rotation drive mechanisms; 81: motor; 82: threaded rod; 83: lifting bracket; 83a: main part of the lifting bracket; 83b: connecting part; 83c: hole; 83d: screw hole; 83e: guide hole; 84: mounting bracket; 85: guide rod; 86: vibration damping connection mechanism; 87: connecting rod; 87a: rod portion; 87b: rod head portion; 87c: external thread part; 87d: bushing; 87e: screw hole; 88: spring; 89: bracket; 90, and 90R: rotation drive mechanisms; 91, 91L, and 91R: motors; 92L and 92R: first telescopic rods; 93a: jack; 93L and 93R: second telescopic rods; 111: storage groove; 112: storage groove; 113: control unit mounting part; 114: microphone mounting part; 121: microphone hole; 131: mounting stud; 200: cockpit controller; 300: central console; 400: loudspeaker; 401: navigation map display picture; 402: vehicle speed display picture; 403: music playing picture; 411L and 411R: through hole; 412: mounting column; 421L and 421R: camera module connection cables; 422: camera module housing; 423: sensor; 841: upper holding part; 841a: threaded rod mounting hole; 841b: guide rod fastening hole; 842: lower holding part; 842a: through hole; 842b: guide rod fastening hole; 843: motor mounting part; 844L and 844R: motor mounting parts; 845: mounting hole; 892: camera module mounting part; 893L and 893R: through holes; and 911L and 911R: output shafts.

DETAILED DESCRIPTION

The following describes specific implementations with reference to accompanying drawings.

A first implementation relates to a vehicle-mounted electronic device 100.

In the following description, for ease of understanding, front, rear, left, right, up and down directions are defined, where a vertical direction of a display picture of a display unit 20 is used as an up-down direction, a horizontal direction of the display picture is used as a left-right direction, and a direction perpendicular to the display picture is used as a front-rear direction. In the implementation described below, the front-rear direction is also a front face-back face direction of the vehicle-mounted electronic device. A front face of the vehicle-mounted electronic device refers to a direction in which the display unit is located, and a back face refers to a direction opposite to the direction in which the display unit is located. In addition, these directions are also indicated in some of the accompanying drawings.

In addition, unless otherwise specified, these directions used in the description of each mechanism, component, and the like refer to directions in a mounting state.

Figure 1:
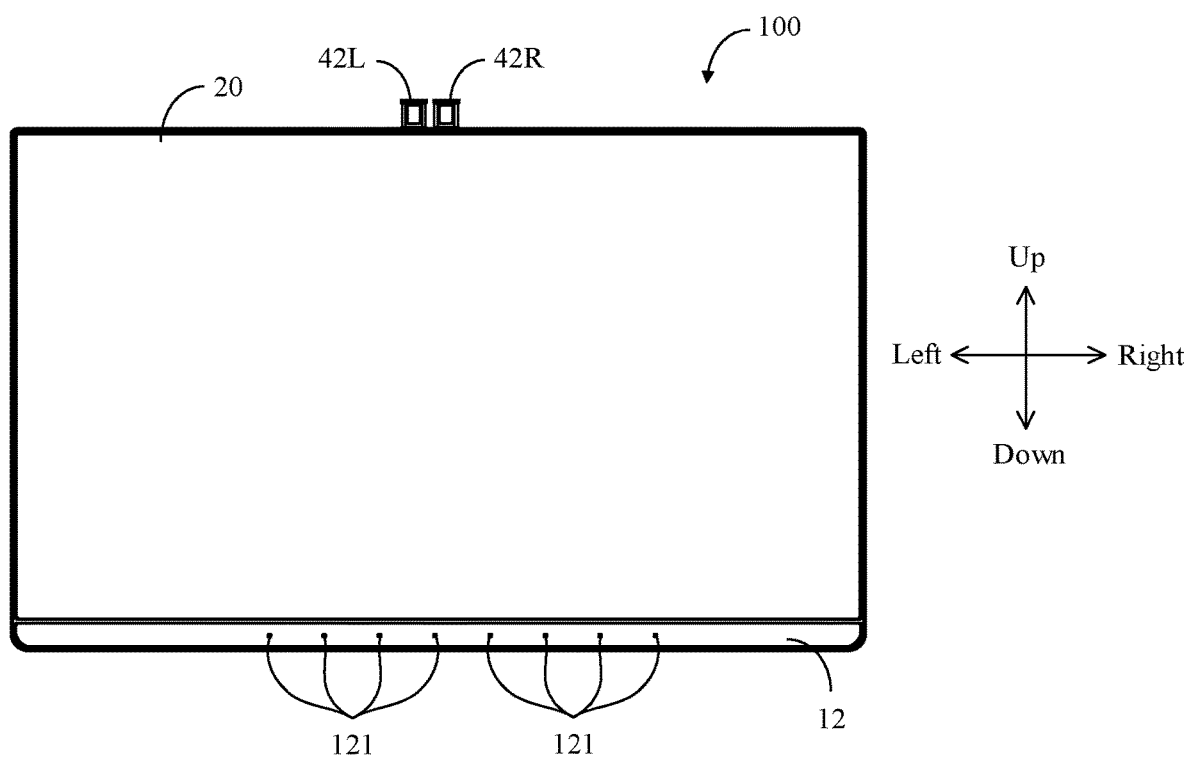
FIG. 1 is a schematic diagram of a vehicle-mounted electronic device according to an embodiment.
Figure 2:
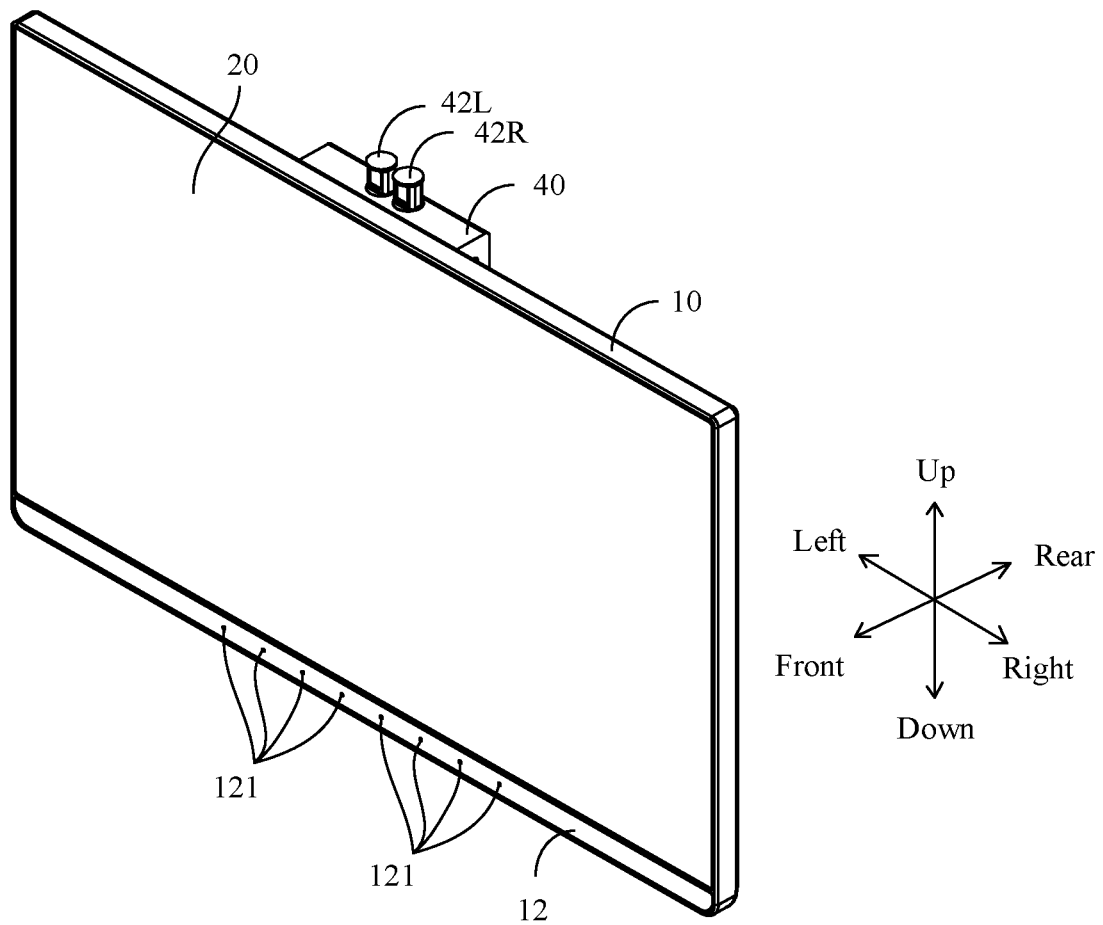
FIG. 2 is a schematic diagram of another vehicle-mounted electronic device according to an embodiment.
Figure 3:
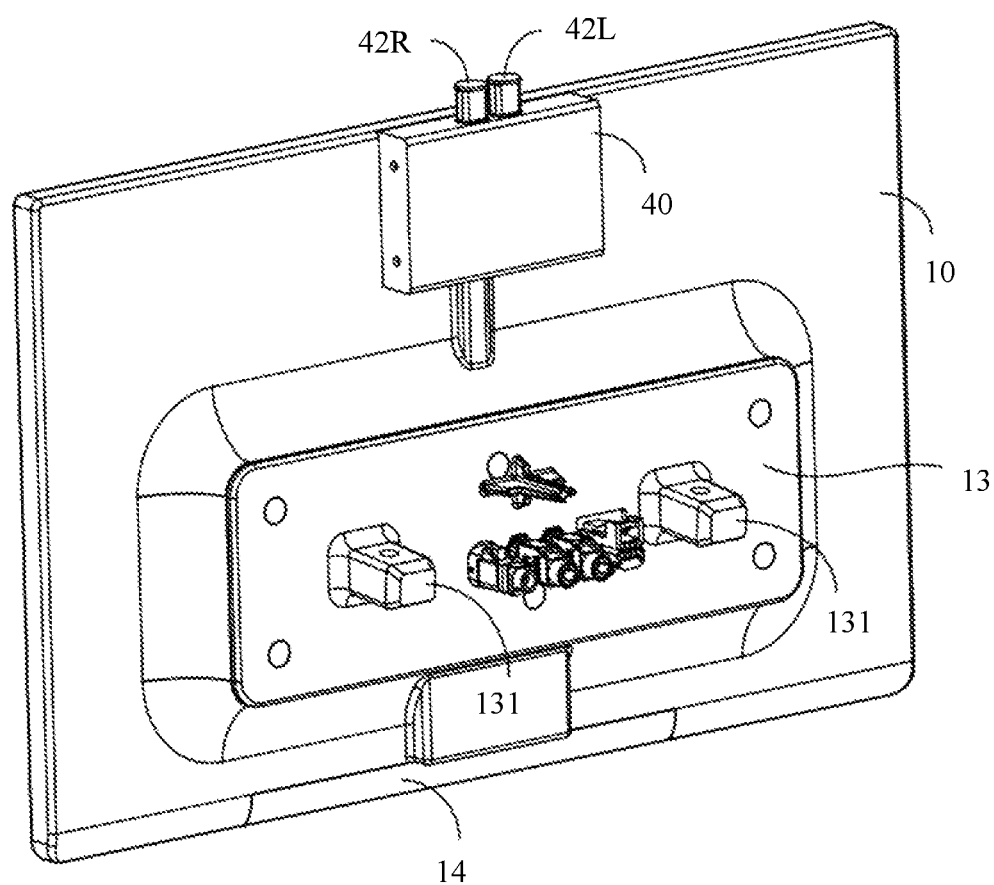
FIG. 3 is a schematic diagram of still another vehicle-mounted electronic device according to an embodiment.
Figure 4:
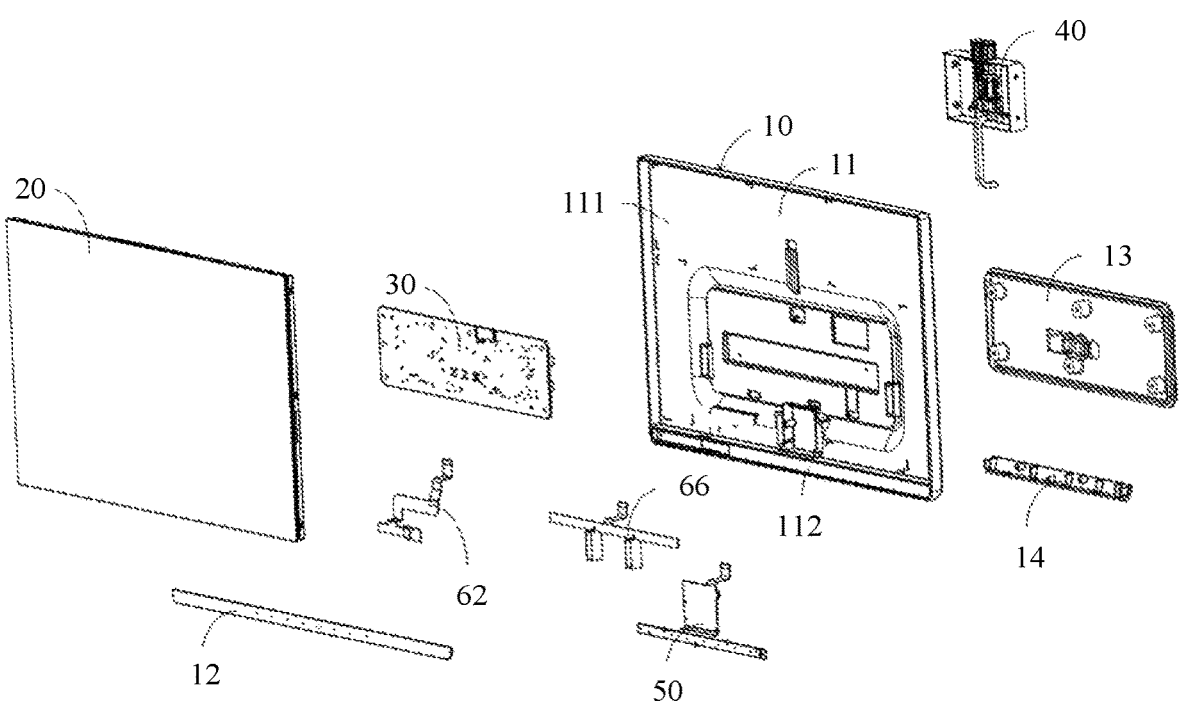
FIG. 4 is a schematic diagram of a breakdown structure of a vehicle-mounted electronic device according to an embodiment.
Figure 18:
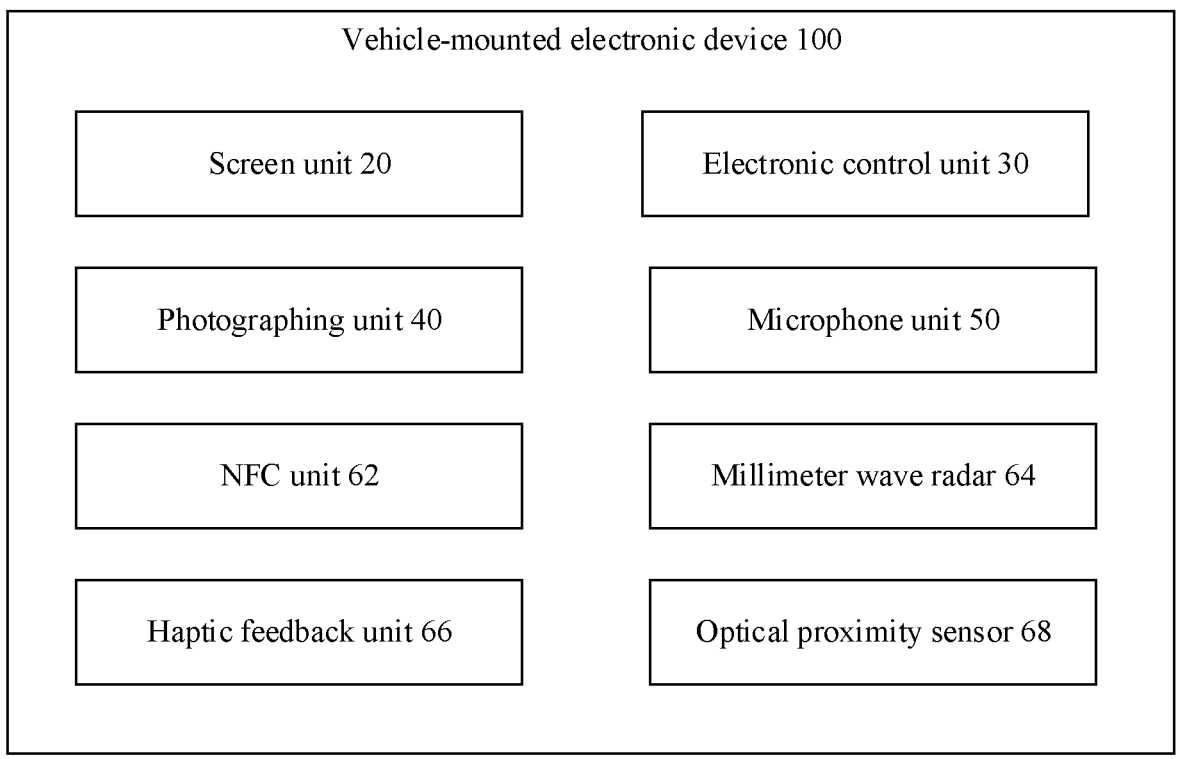
FIG. 18 is a logic block diagram of a vehicle-mounted electronic device according to an embodiment.

FIG. 1 is a schematic front view of a vehicle-mounted electronic device according to an embodiment. A camera module is in a lifting state. FIG. 2 is a schematic diagram of another vehicle-mounted electronic device according to an embodiment, and is a schematic oblique diagram of the vehicle-mounted electronic device viewed from the front. A camera module is in a lifting state. FIG. 3 is a schematic diagram of still another vehicle-mounted electronic device according to an embodiment, and is a schematic oblique diagram of the vehicle-mounted electronic device viewed from the rear. A camera module is in a lifting state. FIG. 4 is a schematic diagram of a breakdown structure of a vehicle-mounted electronic device according to an embodiment. FIG. 18 is a logic block diagram of a vehicle-mounted electronic device according to an embodiment.

The vehicle-mounted electronic device 100 in this implementation is a vehicle-mounted display apparatus of a vehicle, and is configured to, for example, display a navigation picture, a music playing picture, and content photographed by a camera module 42 described later. Further, the vehicle-mounted electronic device 100 may be configured to implement a man-machine interaction operation and vehicle control. For example, functions of the vehicle, including but not limited to: a vehicle-mounted air conditioner, a sounder, a seat, a window, a driving mode, navigation, displaying, and the like, are operated and/or set by using the vehicle-mounted electronic device 100. In addition, in another implementation, the vehicle-mounted electronic device 100 may also be disposed in a central console area at a front of the vehicle, a rear of a front seat, and an upper part of a cockpit, to provide display information and a man-machine interaction operation function for a passenger sitting in a rear row.

As shown in FIG. 4 and FIG. 18, the vehicle-mounted electronic device 100 includes a main housing 10, a display unit 20, a control unit 30, a photographing unit 40, a microphone unit 50, and a near-field communication (NFC) unit 62, a millimeter wave radar 64, a haptic feedback unit 66, and an optical proximity sensor 68.

The main housing 10 is a frame of the vehicle-mounted electronic device 100, and is configured to mount the display unit 20, the control unit 30, the photographing unit 40, the microphone unit 50, the near field communication unit 62, the millimeter wave radar 64, the haptic feedback unit 66, and the optical proximity sensor 68.

Figure 5:
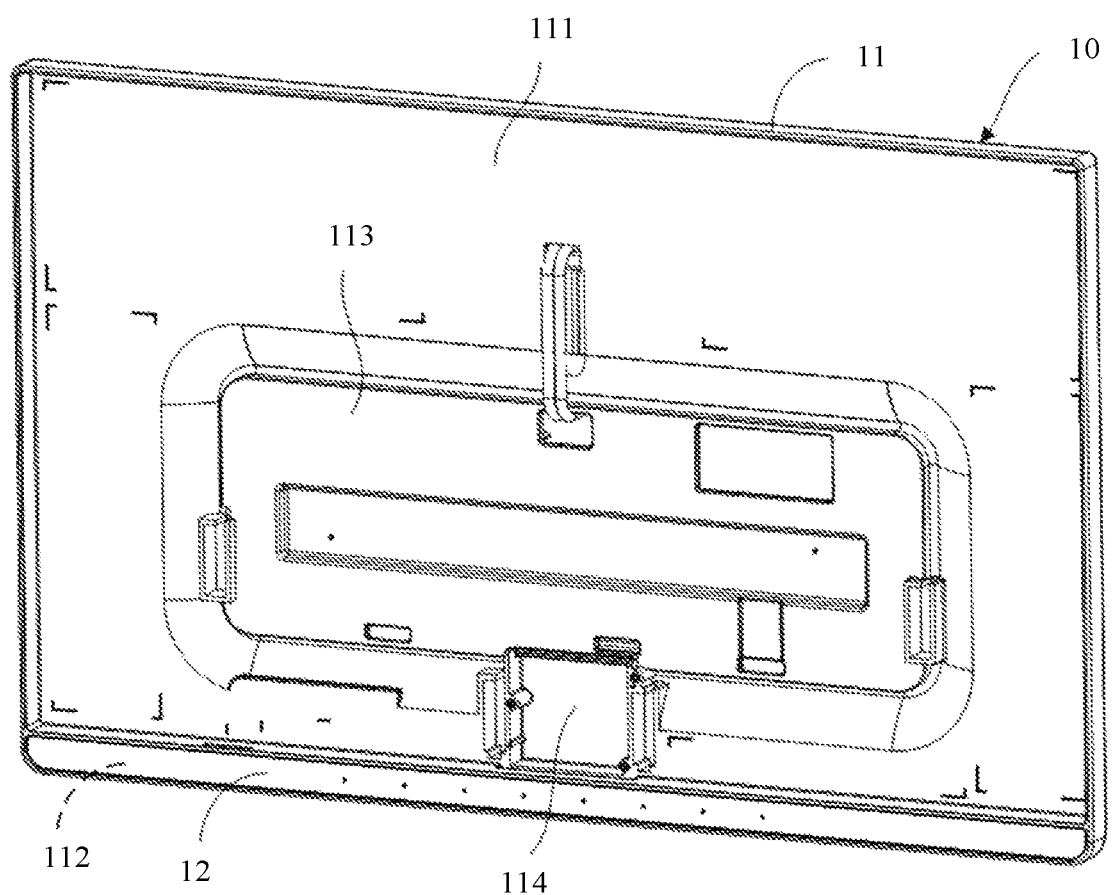
FIG. 5 is a schematic diagram of a housing of a vehicle-mounted electronic device according to an embodiment.
Figure 6:
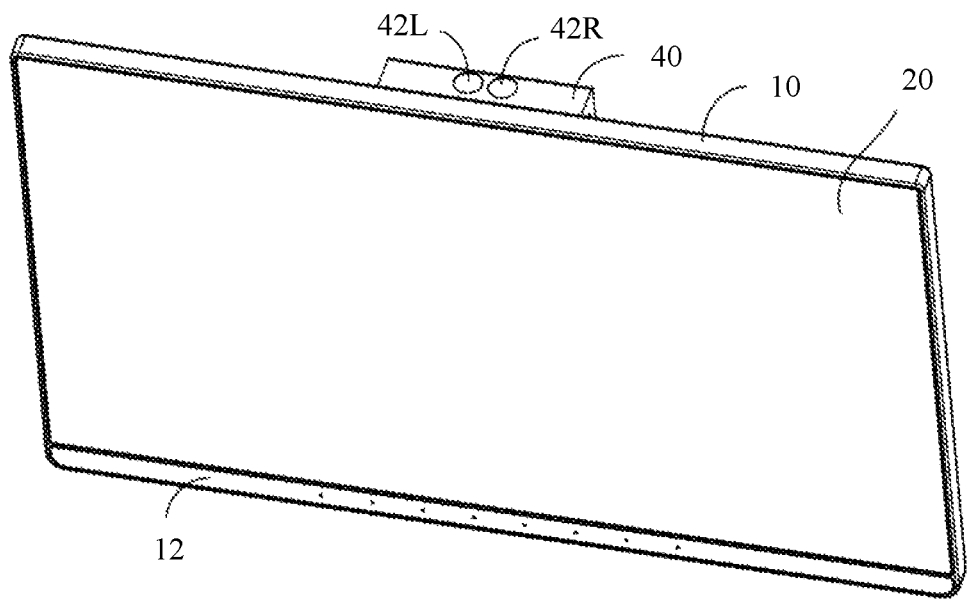
FIG. 6 is a schematic diagram of a vehicle-mounted electronic device according to an embodiment.

FIG. 5 is a schematic diagram of a housing of a vehicle-mounted electronic device according to an embodiment, and is a schematic oblique view of the main housing 10. As shown in FIG. 1 to FIG. 5, the main housing 10 includes a main part 11, a front cover plate 12, a fastening plate 13, and a microphone cover plate 14. In addition, the main housing 10 corresponds to a second housing.

As shown in figures such as FIG. 5, the main part 11 is generally in a shape of a rectangular box, opens toward a front side, and includes a first storage groove 111 and a second storage groove 112. The first storage groove 111 may be provided on an upper part of the main part 11. A shape and a size of the main part are matched with those of the display unit 20, so that the display unit 20 can be stored and mounted. The second storage groove 112 may be provided on a lower edge of the main part 11, to store a portion (precisely, a sensor part) of the microphone unit 50, the NFC unit 60, the millimeter wave radar 64, and the optical proximity sensor 68. In this implementation, since the portion (precisely, the sensor part) of the microphone unit 50, the NFC unit 60, the millimeter wave radar 64, and the optical proximity sensor 68 are stored in the second storage groove 112, it is possible to make a structure compact. It may be understood that the first storage groove 111 and the second storage groove 112 may be arranged up and down, or may be arranged left and right. This disclosure imposes no limitation on a relative position relationship and a specific setting manner between the first storage groove 111 and the second storage groove 112. For example, the first storage groove 111 may also be provided on a lower part of the main part 11, and the second storage groove 112 may be provided on an upper edge of the main part 11. Alternatively, the first storage groove 111 is provided on a middle part of the main part 11, and the second storage groove 112 includes two parts and is provided on left and right edges of the main part 11.

The following describes a specific structure of the main part 11 by using an example in which the first storage groove 111 and the second storage groove 112 are respectively provided on the upper part and the lower part of the main part 11. A control unit mounting part 113 and a microphone mounting part 114 are further disposed on a bottom surface of the first storage groove 111. The control unit mounting part 113 and the microphone mounting part 114 each are formed by a concave part that recesses backwards, and the microphone mounting part 114 is located below the control unit mounting part 113. Recessed space of the microphone mounting part 114 communicates with recessed space of the control unit mounting part 113. The microphone mounting part 114 is configured to store another portion (precisely, a control circuit board) of the microphone unit 50.

The front cover plate 12 is mounted on the main part 11 at a position corresponding to the second storage groove 112, and seals the second storage groove 112. In addition, as shown in FIG. 1, FIG. 2, and the like, a plurality of microphone holes 121 are provided on the front cover plate 12, and the microphone holes 121 are arranged along a left-right direction and correspond to one or more microphones in the microphone unit 50.

As shown in FIG. 3 and FIG. 4, the fastening plate 13 is mounted at a rear of the main part 11, and has a pair of mounting studs 131 protruding rearward. The mounting studs 131 are configured to mount the vehicle-mounted electronic device 100 on a vehicle body, for example, on a central console or a fastening bracket in a central console area. It may be understood that a mounting angle of the vehicle-mounted electronic device 100, that is, an included angle between the vehicle-mounted electronic device 100 and a fixed reference plane of the vehicle, may be adjusted as required. Adjustment may be performed during mounting or after mounting. The adjustment may be implemented by manually adjusting an angle adjustment mechanism, or may be implemented by controlling a button or a man-machine interaction interface operation, and the adjustment may be continuous angle adjustment, or may be angle adjustment in one or more gears.

As shown in FIG. 3 and FIG. 4, the microphone cover plate 14 is mounted at the rear of the main part 11, and is configured to cover the microphone unit 50 (specifically, the sensor part of the microphone unit 50).

In this implementation, the display unit 20 is a touchscreen for displaying a picture, a video, a graphical interface, and the like on a display picture of the touchscreen, and can implement a man-machine interaction operation function. As described above, for example, a navigation picture, a music playing picture, or an operation interface for an operator to perform a touch operation may be displayed. In addition, content photographed by the camera module 42 of the photographing unit 40 may be further displayed during a video call.

The control unit 30 is electrically connected or signally connected to the display unit 20, the photographing unit 40, the microphone unit 50, the near field communication unit 62, the millimeter wave radar 64, the haptic feedback unit 66, the optical proximity sensor 68, and the like, receives signals from these devices or sends a signal to these devices, and can control these devices. In this embodiment, the control unit 30 is a circuit board including an electronic control unit (ECU).

The microphone unit 50 may include one or more microphones. In this implementation, the microphone unit 50 includes a plurality of microphones, and these microphones are arranged along a left-right direction at a lower edge of the main housing 10. The microphone unit 50 is configured to: pick up a sound in a passenger compartment, perform a call or a speech recognition operation, at the same time, perform algorithm recognition based on a sound signal picked up by the microphone unit 50, determine an orientation of a speaker, and control the photographing unit 40 to track based on information about the orientation. For example, it is ensured that the photographing unit 40 always photographs a speaker during a video call.

In addition, in another implementation, the microphones of the microphone unit 50 may be disposed at any position of an edge of the main housing 10, for example, a left/right edge or an upper edge, or may be integrated under a glass cover plate of the display unit 20. Alternatively, a separate frame structure may be disposed in the main housing 10 for the microphones, and the microphones are disposed in the frame structure.

The near field communication unit 62 is configured to implement a function of performing near field communication between the vehicle-mounted electronic device 100 and another terminal device (a mobile terminal). For example, information received by a mobile phone (not shown in the figure) may be sent, by using the near field communication unit 62, to the display unit 20 for display, position information (for example, a position selected by a mobile phone user on a map display picture) of the mobile phone is sent to a vehicle-mounted electronic device 100 for navigation, or navigation information set by the mobile phone (not shown in the figure) is sent to the vehicle-mounted electronic device 100 for navigation.

The millimeter wave radar 64 is used for gesture recognition or liveness detection. The gesture recognition means that, for example, a gesture motion of a driver is detected by the millimeter wave radar 64, so that the driver can operate a vehicle from a distance. For example, operations such as tapping, sliding, page turning, opening, closing, rotation, fast-forward/rewind, and zooming in/out are implemented by using the gesture recognition, to operate and/or select an air conditioning, a window, a sounder, a driving mode, video playing, and the like of the vehicle. In addition, the gesture motion may also be detected by using the camera module 42. The liveness detection means that, for example, whether there is a child, a drunk person, an animal, and the like in a vehicle may be detected, to avoid the child, the drunk person, the animal, and the like in the vehicle from being forgotten and then being in danger. Further, in one or more cases in which the vehicle is locked, the entire vehicle is powered off, and an engine is stalled, after detecting a living body, the millimeter wave radar 64 may send alarm information to a vehicle owner, a driver, a background service system, or an alarm platform by using a vehicle-mounted communication system, and use a lighting system or a whistle for reminding.

The haptic feedback unit 66 includes a linear motor for providing haptic feedback when a passenger performs an operation on an operation interface displayed on the display unit 20, to prompt the passenger whether the passenger actually performs the corresponding operation.

The optical proximity sensor 68 is configured to sense luminance inside a passenger compartment and feed back the luminance to the control unit 30 to control luminance of a display picture of the display unit 20.

The photographing unit 40 is described below.

Figure 7:
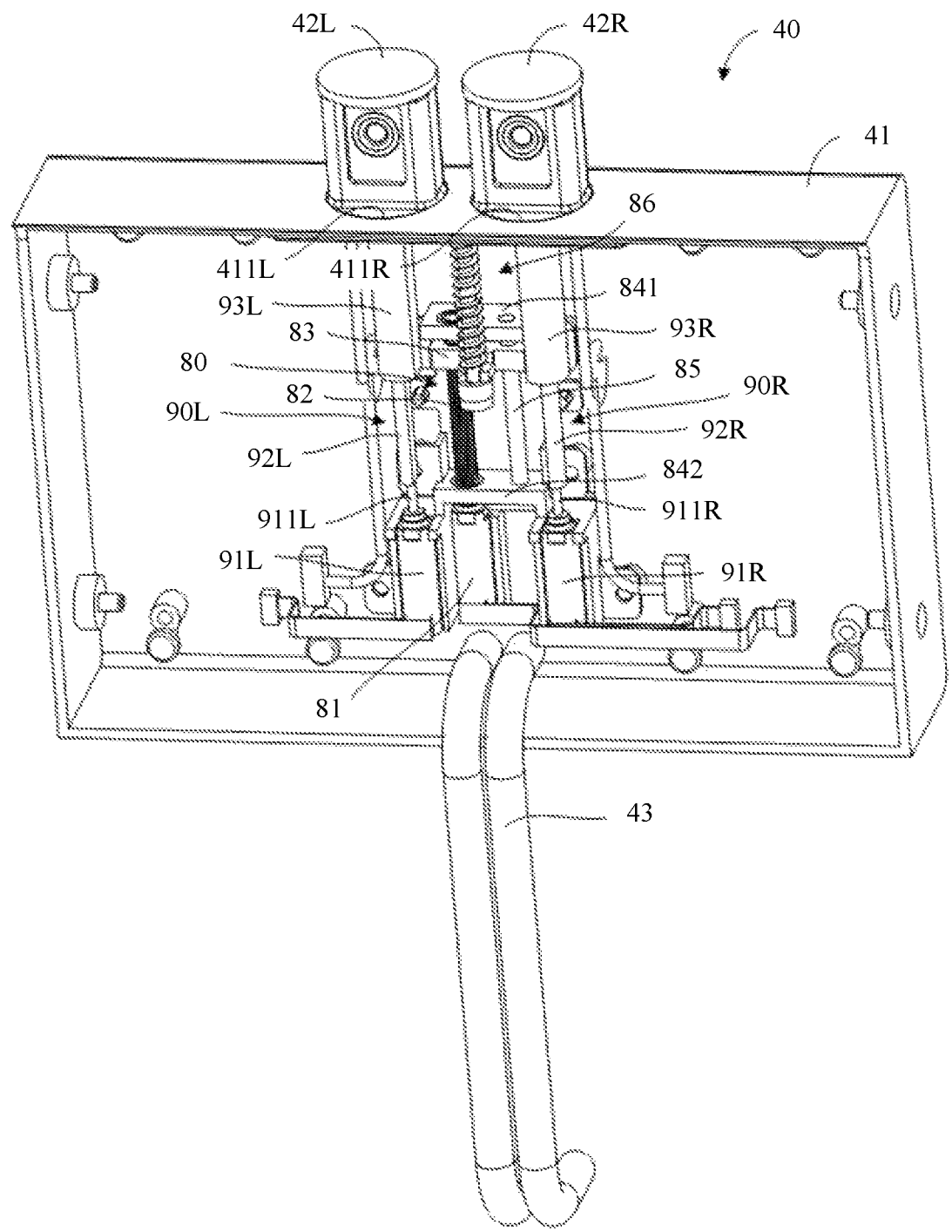
FIG. 7 is a schematic diagram of a photographing unit according to an embodiment.
Figure 8:
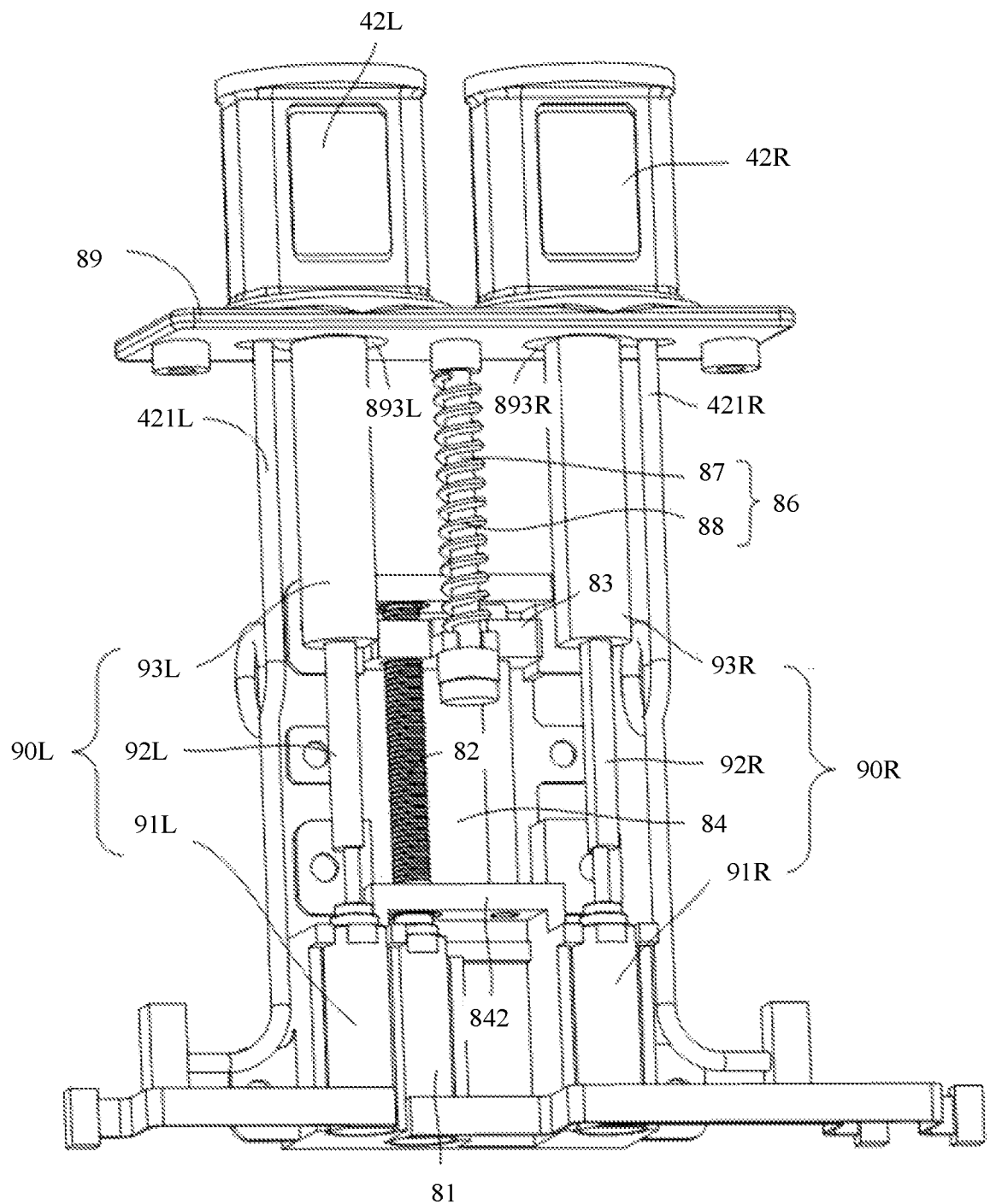
FIG. 8 is a schematic diagram of a photographing unit according to an embodiment.

FIG. 7 is a schematic diagram of a photographing unit according to an embodiment. FIG. 8 is a schematic diagram of a photographing unit according to an embodiment. As shown in FIG. 7 and FIG. 8, the photographing unit 40 includes a photographing unit housing 41, camera modules 42L and 42R, a lifting drive mechanism 80, and a rotation drive mechanism 90.

The photographing unit housing 41 (corresponding to the first housing) is in a rectangular shape as a whole, opens toward a front, is detachably mounted on a back surface of the main housing 10, and is configured to store the camera modules 42L and 42R, the lifting drive mechanism 80, and the rotation drive mechanism 90. Detachable manner may be a screw connection, a pinch buckle connection, a magnetic connection, a slide groove buckle connection, and the like. Because the photographing unit housing 41 can be disassembled, when the photographing unit 40 is upgraded, for example, a pixel of the camera module is increased, a field of view (FOV) is increased, and an appearance model is optimized, quick disassembly and upgrade can be performed. This improves user experience. In addition, since the photographing unit housing 41 is mounted on the back surface of the main housing 10, that is, the photographing unit 40 is mounted on an outside of the main housing 10, the photographing unit housing 41 can be easily disassembled and assembled. In addition, in another implementation, the photographing unit may be stored in the main housing 10, or the photographing unit housing 41 and the main housing 10 may be deformed into one housing. The housing stores not only the display unit 20, the microphone unit 50, and the like, but also the camera module 42, the lifting drive mechanism 80, and the rotation drive mechanism 90.

Further, two through holes 411L and 411R are provided on an upper surface of the photographing unit housing 41, and the two through holes 411L and 411R are respectively passed through by the two camera modules 42L and 42R, so that a lifting up and down action and/or a rotation action can be performed.

In this implementation, the two camera modules 42L and 42R are disposed. One of the two camera modules is a camera monitor system (CMS) camera module (corresponding to a first camera module), for example, a color camera module (a red, green, and blue (RGB) camera module) for taking a photo, making a video call, and the like. The other is a driver monitor system (DMS) camera module (corresponding to a second camera module), for example, a depth camera module (including a time of flight (ToF) camera module, or the like), may be configured to perform face recognition and gesture motion recognition, monitor a fatigue state of a driver, and the like. In addition, in another implementation, the photographing unit 40 may also include two CMS camera modules. In this case, one of the two CMS camera modules may be a long-focus module and the other may be a short-focus module. In addition, the photographing unit 40 may have only one camera module 42 or more than three camera modules 42, to implement functions such as face recognition, action recognition, driver and passenger status monitoring, multi-focal photographing, and wide-angle photographing. Further, the camera module 42 may be detachably disposed in the photographing unit 40, so that efficiency and convenience of maintenance and part replacement can be improved, and a user can easily upgrade the camera module 42. The upgrade may be one or more camera modules in the camera module 42.

The camera modules 42L and 42R include one or more of a lens group, a transmission mechanism, a motor chip, and an image sensor chip. The lens group includes an optical lens. The transmission mechanism is configured to drive the lens group to implement a function such as zooming. The motor chip is configured to control a drive mechanism.

In embodiments, letters "L" and "R" are added after a number 42 to distinguish the two camera modules. However, when the two camera modules are collectively referred and are not distinguished, the letters "L" and "R" are omitted and the two camera modules are directly referred to as the camera module 42. Similarly, when mechanisms, components, and parts (for example, rotation drive mechanisms 80L and 80R described later) provided for the two camera modules 42L and 42R are described, the letters "L" and "R" are also added after numbers for distinguishing. However, when the mechanisms, components, and parts are collectively referred and are not distinguished, the letters "L" and "R" are omitted and the mechanisms, components, and parts are directly represented by numbers.

The lifting drive mechanism 80 is configured to drive the camera modules 42L and 42R to be lifted up and down inside or outside the photographing unit housing 41 in response to an instruction of controlling a man-machine interface by a button. In this way, when the camera modules 42L and 42R do not need to be used for photographing or in response to an operation instruction of the user, the camera modules 42L and 42R is enabled to be lowered into the photographing unit housing 41. This protects privacy. The man-machine interface herein may be, for example, at least one of a voice interface, a touch interface, and a sensing interface. The voice interface, the touch interface, and the sensing interface respectively correspond to the microphone unit 50, the display unit 20, and the millimeter wave radar 64 in this implementation, and are configured to receive a voice instruction, a touch operation instruction, and a gesture motion instruction of a passenger. In addition, in this implementation, the lifting drive mechanism 80 is not only configured to perform the foregoing driving in response to the instruction of the man-machine interface, but also configured to, for example, drive the camera module 42 to move to a lifting state in response to startup of a vehicle.

The rotation drive mechanism 90 is configured to drive the camera modules 42L and 42R to rotate left and right in response to the instruction of controlling the man-machine interface by the button, to adjust a photographing range. This can ensure that a photographing object (a passenger) is aligned during photographing. Optionally, one of the camera modules 42L and 42R may be rotated to a state facing a front of the vehicle, which functions as a car recorder. In addition, in this implementation, the rotation drive mechanism 90 is not only configured to perform the foregoing driving in response to the instruction of the man-machine interface, but also configured to, for example, drive the camera module 42 to rotate to a desired angle, for example, an angle aligned with a driver, in response to the startup of the vehicle.

The lifting drive mechanism 80 and the rotation drive mechanism 90 are described in more detail below.

The lifting drive mechanism 80 is first described.

As shown in FIG. 7 and FIG. 8, the lifting drive mechanism 80 includes a motor 81, a threaded rod 82, a lifting bracket 83, an upper holding part 841, a lower holding part 842, a guide rod 85, a vibration damping connection mechanism 86, and a bracket 89.

Figure 9:
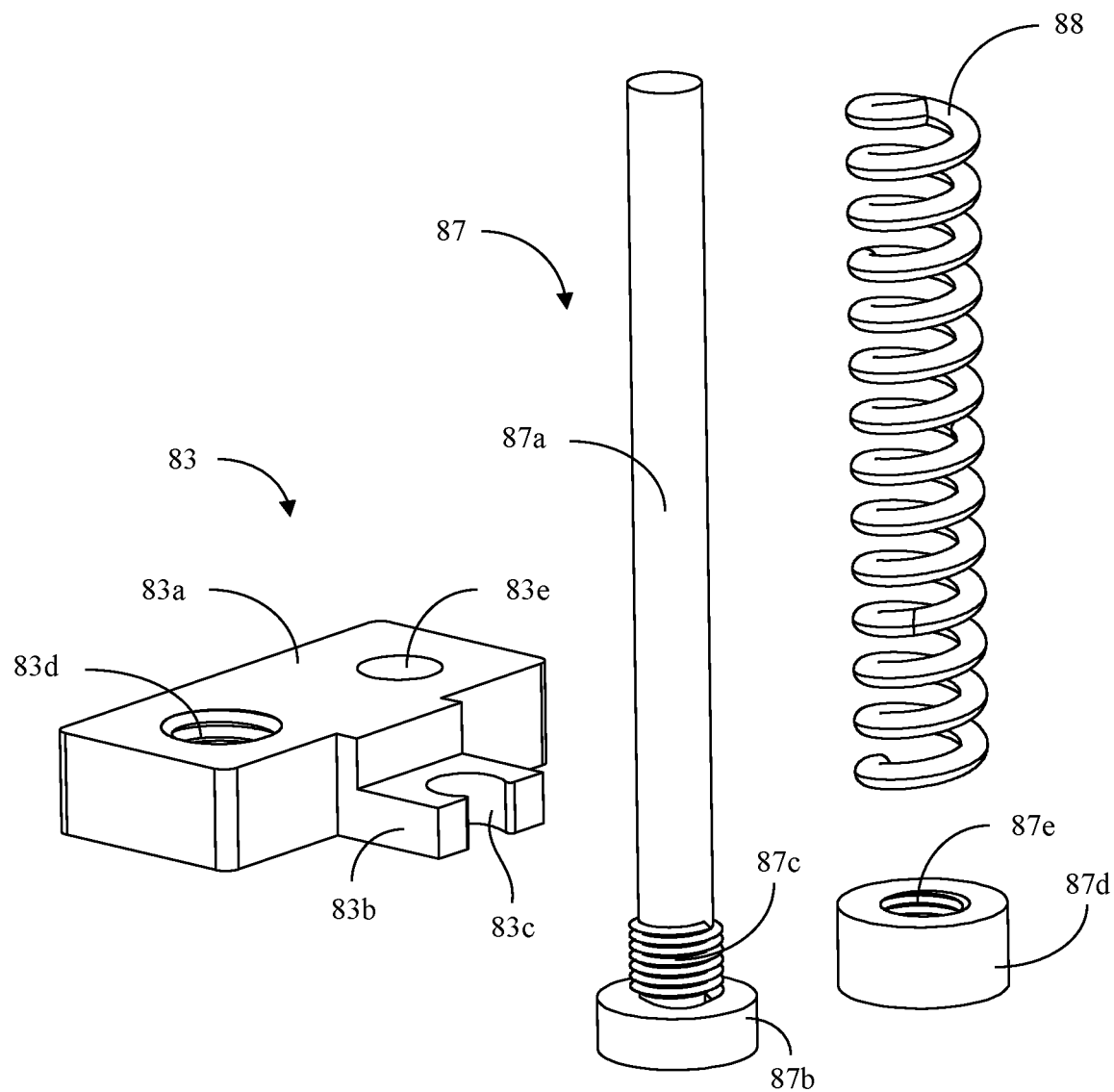
FIG. 9 is a schematic diagram of a connection base and a vibration damping connection mechanism according to an embodiment.

The motor 81 is mounted on the photographing unit housing 41 and is a power source in the lifting drive mechanism 80. The threaded rod 82 is connected to an output shaft (not shown) of the motor 81, and can be driven by the motor 81 to rotate. The lifting bracket 83 is threadedly connected to the threaded rod 82, and the lifting bracket 83 is moved up and down by using a threaded screwing effect when the threaded rod 82 rotates. Specifically, FIG. 9 is a schematic diagram of a connection base and a vibration damping connection mechanism according to an embodiment. With reference to FIG. 9, the lifting bracket 83 has a main part 83a that is substantially rectangular, and a screw hole 83d is provided on the main part 83a. The threaded rod 82 is screwed into the screw hole 83d, so that the lifting bracket 83 is moved up and down by using a threaded screwing effect when the threaded rod 82 rotates.

Figure 13:
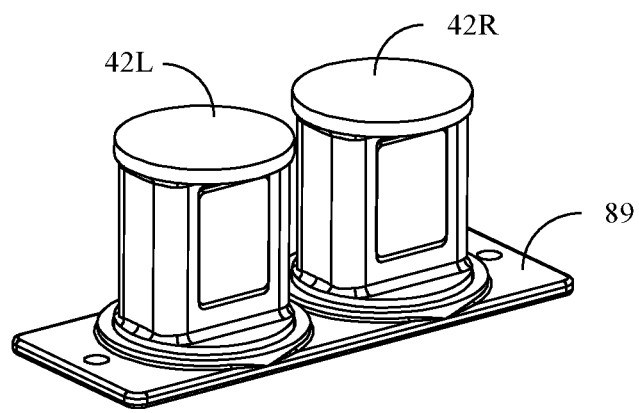
FIG. 13 is a schematic diagram of a camera module and a fulcrum bearing according to an embodiment.
Figure 14:
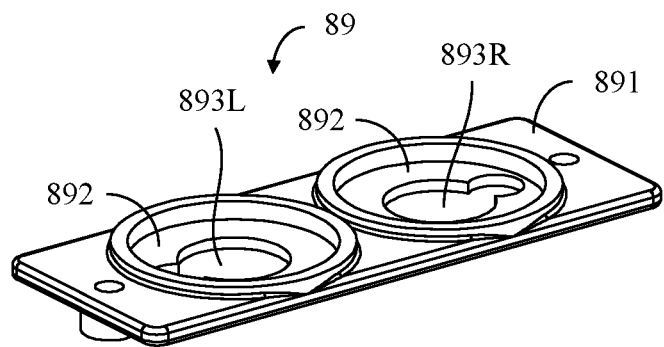
FIG. 14 is a schematic diagram of a fulcrum bearing according to an embodiment.

The vibration damping connection mechanism 86 is configured to connect the lifting bracket 83 to the bracket 89. As shown in FIG. 8, FIG. 13, FIG. 14, and the like, the bracket 89 has two camera module mounting parts 892 on which the two camera modules 42L and 42R are rotatably mounted. In addition, the two camera modules 42L and 42R are rotatable relative to the bracket 89. In this way, when the lifting bracket 83 moves up and down, the bracket 89 can be driven to move up and down, so that the two camera modules 42L and 42R can move up and down relative to the photographing unit housing 41. Further, the two camera modules 42L and 42R can switch between a position that the two camera modules raise to an outside of the photographing unit housing 41 through the through holes 411L and 411R and a position that the two camera modules lower into the photographing unit housing 41 through the through holes 411L and 411R. In addition, FIG. 13 is a schematic diagram of a camera module and a fulcrum bearing according to an embodiment. FIG. 14 is a schematic diagram of a fulcrum bearing according to an embodiment. As shown in FIG. 13 and FIG. 14, two through holes 893L and 893R are provided on the bracket 89. The through holes 893L and 893R are used for second telescopic rods 93L and 93R and camera module connection cables 421L and 421R to pass through.

The upper holding part 841 and the lower holding part 842 are fastened to the photographing unit housing 41 and arranged along an up-down direction, that is, the upper holding part 841 is disposed above and the lower holding part 842 is disposed below. The guide rod 85 is arranged along an up-down direction in a length direction, and an upper end of the guide rod 85 is fastened to the upper holding part 841 and a lower end of the guide rod 85 is fastened to the lower holding part 842. As shown in FIG. 9, a guide hole 83e is provided on the lifting bracket 83, and the guide rod 85 passes through the guide hole 83e, so that the guide rod 85 guides the lifting bracket 83 to move up and down.

In addition, an upper end of the threaded rod 82 is rotatably held on the upper holding part 841. For example, the upper end of the threaded rod 82 is mounted on the holding part 841 by using a bearing. A through hole 842a is provided on the lower holding part 842, and the threaded rod 82 passes through the through hole 842a.

The vibration damping connection mechanism 86 is described below.

As shown in FIG. 8 and FIG. 9, the vibration damping connection mechanism 86 includes a connecting rod 87 and a spring 88. The connecting rod 87 includes a rod portion 87a, a rod head portion 87b, an external thread part 87c, and a bushing 87d.

The rod portion 87a is in a shape of an elongated rod and is arranged along an up-down direction in a length direction. In addition, an upper end of the rod portion is fastened to the bracket 89, and the rod head portion 87b is integrally formed at a lower end of the rod portion. A diameter of the rod head portion 87b is larger than that of the rod portion 87a. Further, the external thread part 87c is disposed at a position of the rod portion 87a near the rod head portion 87b. A screw hole 87e is formed in the bushing 87d, and the screw hole 87e and the external thread part 87c can be screwed together, so that the bushing 87d is mounted to the rod portion 87a.

The spring 88 is sleeved on the rod portion 87a in a compressed state. An upper end of the spring abuts against a lower surface of the bracket 89, and a lower end of the spring abuts against an upper surface of the bushing 87d via the lifting bracket 83. In this case, the spring is sandwiched between the bracket 89 and the bushing 87d.

As shown in FIG. 9, the lifting bracket 83 has a connecting part 83b at a front of the main part 83a, the connecting part 83b protrudes forward from a front surface of the main part 83a, and a hole 83c is formed on the connecting part 83b. The hole 83c is in a shape of a notch open toward a front when viewed from top. The rod portion 87a of the connecting rod 87 passes through the hole 83c, so that the lifting bracket 83 and the connecting rod 87 can be relatively moved up and down, but cannot be relatively moved in a direction perpendicular to the rod portion 87a. Further, the connecting part 83b is sandwiched between the spring 88 and the upper surface of the bushing 87d. In this way, when the motor 81 drives the threaded rod 82 to rotate to move the lifting bracket 83 upward, the connecting part 83b of the lifting bracket 83 pushes the bracket 89 upward by using the spring 88. This moves the camera module 42 mounted on an upper surface of the bracket 89 upward. When the motor 81 drives the threaded rod 82 to rotate to move the lifting bracket 83 downward, the connecting part 83b of the lifting bracket 83 pushes the bushing 87d downward. This moves the rod portion 87a downward, to drive the bracket 89 to move downward. Finally, the camera module 42 mounted on the upper surface of the bracket 89 is moved downward.

The vibration damping connection mechanism 86 is adopted. Because the spring 88 is disposed between the lifting bracket 83 and the bracket 89 on which the camera module 42 is mounted, when the camera module 42 in a lifting state is impacted by an external force, the camera module 42 can move downward by compressing the spring 88. This avoids damage to the camera module 42. Alternatively, when a passenger presses the camera module 42 downward to lower the camera module 42 into the photographing unit housing 41, the passenger can feel a flexible sense of an operation due to presence of the spring 88.

The rotation drive mechanism 90 is described in detail below.

In this implementation, two rotation drive mechanisms 90L and 90R are provided, and respectively drive the camera modules 42L and 42R to rotate. As described above, in embodiments, in description of the two rotation drive mechanisms 90L and 90R and respective components and parts of the two rotation drive mechanisms, letters "L" and "R" are added after numbers for distinguishing. When the two rotation drive mechanisms do not need to be distinguished, these letters are removed.

The following uses the rotation drive mechanism 90L provided for the camera module 42L as an example for description. The rotation drive mechanism 90R provided for the camera module 42R and the rotation drive mechanism 90L are symmetrical from left to right. Therefore, detailed description of the rotation drive mechanism 90R is omitted.

As shown in FIG. 7 and FIG. 8, the rotation drive mechanism 90L includes a motor 91L, a first telescopic rod 92L, and a second telescopic rod 93L.

The motor 91L, for example, a stepper motor, is mounted on the photographing unit housing 41 and has an output shaft 911L. A lower end of the first telescopic rod 92L is fastened to the output shaft 911L. An upper end of the first telescopic rod 92L is connected to a lower end of the second telescopic rod 93L in a manner that enables the first telescopic rod 92L and the second telescopic rod 93L to be relatively movable up and down but not to be relatively rotatable. An upper end of the second telescopic rod 93L is fastened to the camera module 42L. In this way, when the output shaft 911L of the motor 91L rotates, the first telescopic rod 92L and the second telescopic rod 93L transmit rotation of the output shaft 911L to the camera module 42L, to drive the camera module 42L to rotate left and right, so as to adjust a photographing range of the camera module 42L. In addition, it can be ensured that a photographing object, such as a passenger in a vehicle, is aligned during photographing. In addition, in this implementation, the microphone unit 50 identifies an orientation of a speaker, and controls a left-right rotation position of the camera module 42 based on information about the orientation. For example, it is ensured that the camera module 42 is always aligned with the speaker during video photographing or a video call.

Further, since the rotation drive mechanism 90L adopts a structure in which the first telescopic rod 92L and the second telescopic rod 93L can be moved up and down relative to each other, that is, the first telescopic rod 92L and the second telescopic rod 93L can be telescopic up and down, when the camera module 42L is driven by the lifting drive mechanism 80 to be lifted up and down, the rotation drive mechanism 90L can be well adapted to the lifting up and down action. In addition, both the camera module 42 driven to rotate and adaption to the lifting up and down action of the camera module 42 are simply implemented by using the two telescopic rods. This enables a structure of the rotation drive mechanism 90L to be compact and facilitates miniaturization of the photographing unit 40.

Figure 10:
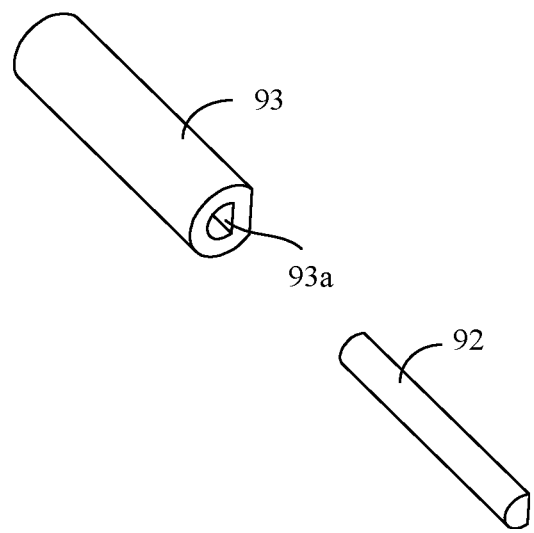
FIG. 10 is a schematic diagram of a first telescopic rod and a second telescopic rod according to an embodiment.

In this implementation, the foregoing "to be relatively movable up and down but not to be relatively rotatable" is realized through a profile-surface connection. Specifically, FIG. 10 is a schematic diagram of a first telescopic rod and a second telescopic rod according to an embodiment. As shown in FIG. 10, a cross section (a cross section perpendicular to a length direction) of the first telescopic rod 92L is non-circular. A jack 93a with a non-circular cross section is formed on a lower end surface of the second telescopic rod 93L. The first telescopic rod 92L is inserted into the jack 93a, and can be relatively movable up and down along the jack 93a, but cannot rotate relative to the second telescopic rod 93L. In another example, another manner may also be used to implement the "to be relatively movable up and down but not to be relatively rotatable", for example, a manner of a guiding button connection. In this implementation, the foregoing "to be relatively movable up and down but not to be relatively rotatable" is realized through the profile-surface connection. For example, compared with a manner of using a guiding button, a manner of the profile-surface connection has a lower requirement for diameters of the first telescopic rod 92L and the second telescopic rod 93L. Even if the first telescopic rod 92L and the second telescopic rod 93L are thin, the first telescopic rod 92L and the second telescopic rod 93L can easily achieve the "to be relatively movable up and down but not to be relatively rotatable", so that a structure of the rotation drive mechanism 90L is more compact, and the photographing unit 40 is more miniaturized.

Figure 11:
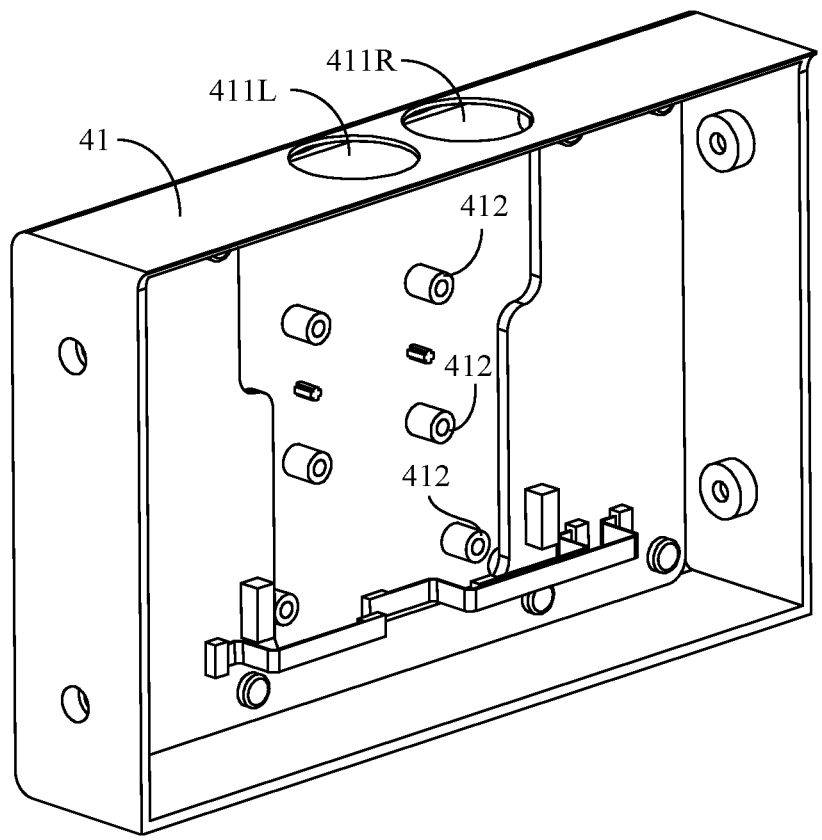
FIG. 11 is a schematic diagram of a housing of a photographing unit according to an embodiment.
Figure 12:
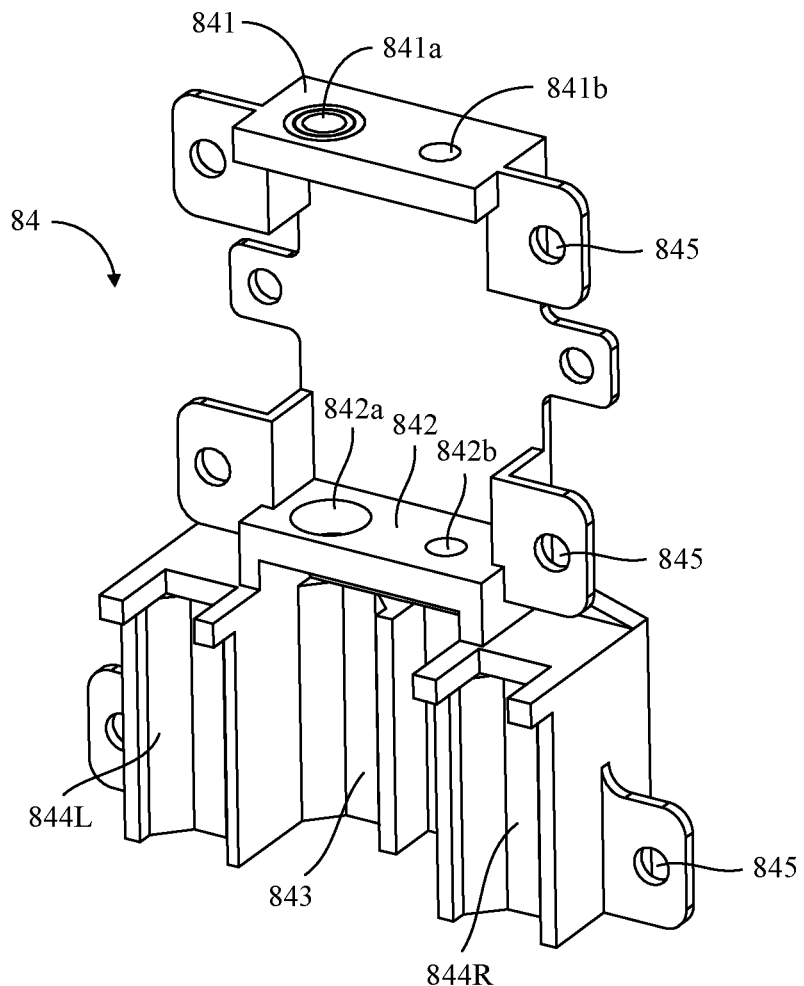
FIG. 12 is a schematic diagram of a mount bracket according to an embodiment.

FIG. 11 is a schematic diagram of a photographing unit housing according to an embodiment. FIG. 12 is a schematic diagram of a mounting bracket according to an embodiment.

As shown in FIG. 11, a plurality of mounting columns 412 are disposed on a bottom surface of the photographing unit housing 41, and are configured to mount a mounting bracket 84 described below. As shown in FIG. 12, the mounting bracket 84 is an integrally formed component, and includes an upper holding part 841, a lower holding part 842, motor mounting parts 843, 844L, 844R, and a plurality of mounting holes 845.

A threaded rod mounting hole 841a for rotatably mounting the threaded rod 82 and a guide rod fastening hole 841b for fastening an upper end of the guide rod 85 are formed in the upper holding part 841. The upper holding part 841 may further serve to limit travel of the lifting bracket 83, that is, when the lifting bracket 83 moves upward, the lifting bracket 83 is stopped by abutting against a lower surface of the upper holding part 841, to stop further upward movement.

A through hole 842a for the threaded rod 82 to pass through and a guide rod fastening hole 842b for fastening a lower end of the guide rod 85 are formed in the lower holding part 842.

The motor mounting part 843 is configured to mount the motor 81, and the motor mounting parts 844L and 844R are configured to mount the motor 91L and a motor 91R. A quantity of mounting holes 845 is consistent with a quantity of mounting columns 412 provided on the bottom surface of the photographing unit housing 41, and is configured to fasten the mounting bracket 84 to the photographing unit housing 41.

In this implementation, the motor mounting parts 843, 844L, and 844R, the upper holding part 841, and the lower holding part 842 are integrally formed on the mounting bracket 84. This reduces a quantity of components and reduces assembly time.

Figure 15:
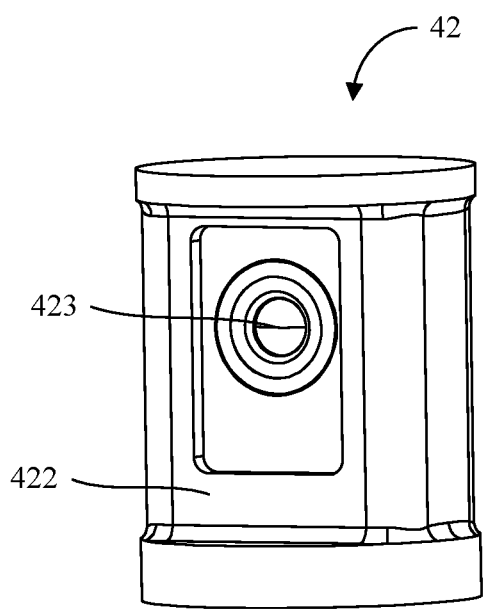
FIG. 15 is a schematic diagram of a camera module according to an embodiment.

In the foregoing description, the camera module 42 may be lifted up and down, and may be rotated left and right. Optionally, on this basis, the camera module 42 may be formed as a structure in which a camera module body inside the camera module 42 can rotate up and down. Specifically, FIG. 15 is a schematic diagram of a camera module according to an embodiment. As shown in FIG. 15, the camera module 42 includes a camera module housing 422 and a camera module body 423 stored in the camera module housing 422. The camera module body 423 includes a lens group, a transmission mechanism, a motor chip, and an image sensor chip, and is mounted in the camera module housing 422 in a manner that the camera module body can rotate around an axis extending along a left-right direction as a center. Because a tilt angle of the vehicle-mounted electronic device 100 may vary based on different vehicle models, different designs, and different configurations, the camera module 42 is formed as a structure in which a camera module body inside can rotate up and down. This can ensure that an optical axis of the camera module body 423 is located in a horizontal plane. The camera module body 423 may be held in a plurality of rotational positions by using a locking structure. In this case, the rotational position of the camera module body 423 may be manually adjusted. In addition, the camera module body 423 may be driven by a motor to rotate. In this implementation, the camera module housing 422 is lifted up and down and rotated left and right by the lifting drive mechanism 80 and the rotation drive mechanism 90, so that the camera module body 423 is lifted up and down and rotated left and right. Adjustment of a pitch angle is realized by rotating the camera module body 423 relative to the camera module housing 422 around an axis extending along a left-right direction as a center. For example, compared with a manner in which the camera module housing 422 moves to implement lifting up and down, left-right rotation, and pitch angle adjustment rotation, a manner of the foregoing adjustment can make a structure simplified and the photographing unit 40 miniaturized.

Further, 421L and 421R in FIG. 8 represent connecting cables of the camera modules 42L and 42R, and 43 in FIG. 7 represents connecting cables of the photographing unit 40.

As described above, the vehicle-mounted electronic device 100 of this implementation is a central control screen of the vehicle, and includes the photographing unit 40, the microphone unit 50, the near field communication unit 62, the millimeter wave radar 64, the haptic feedback unit 66, and the optical proximity sensor 68. In this way, one vehicle-mounted electronic device 100 integrates a plurality of functions, to implement intelligent interconnection. An intelligent vehicle-mounted terminal can meet requirements of a plurality of scenarios.

In the foregoing description, the vehicle-mounted electronic device is described by using the central display screen of the vehicle as an example. However, this disclosure may also be applicable to another vehicle-mounted electronic device.

A second implementation relates to a cockpit system and a vehicle. The cockpit system and the vehicle have the vehicle-mounted electronic device 100 in the foregoing first implementation. Therefore, some content of the vehicle-mounted electronic device 100 is appropriately omitted in this implementation.

Figure 16:
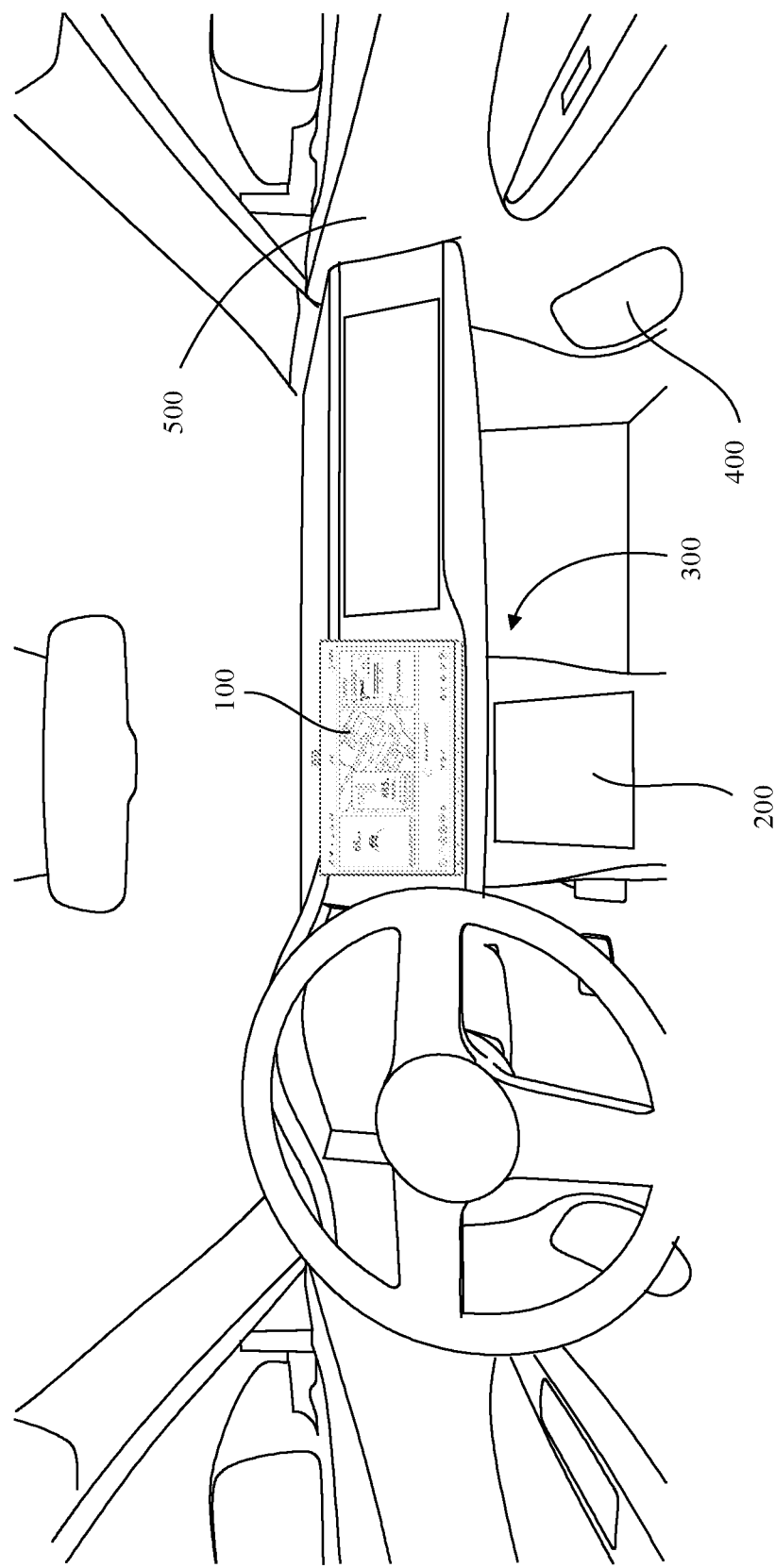
FIG. 16 is a schematic diagram of a cockpit system according to an embodiment.

FIG. 16 is a schematic diagram of a structure of a cockpit system according to this implementation. As shown in FIG. 16, the cockpit system of this implementation includes the vehicle-mounted electronic device 100, a cockpit controller 200, a loudspeaker 400, and the like. Specifically, in a passenger cabin (passenger compartment) of the vehicle, the vehicle-mounted electronic device 100 is disposed on a central console 300, the cockpit controller 200 is provided under the vehicle-mounted electronic device 100 in a dash board, and the loudspeaker 400 is provided on an inside of a door. In addition, in this implementation, the vehicle-mounted electronic device 100 is fastened to the central console 300. However, in another implementation, the vehicle-mounted electronic device 100 may be mounted on the central console 300 in a manner that a tilt angle (an angle between a screen surface of the display unit 20 and a vertical direction is usually over 10 degrees) is adjustable.

Figure 17:
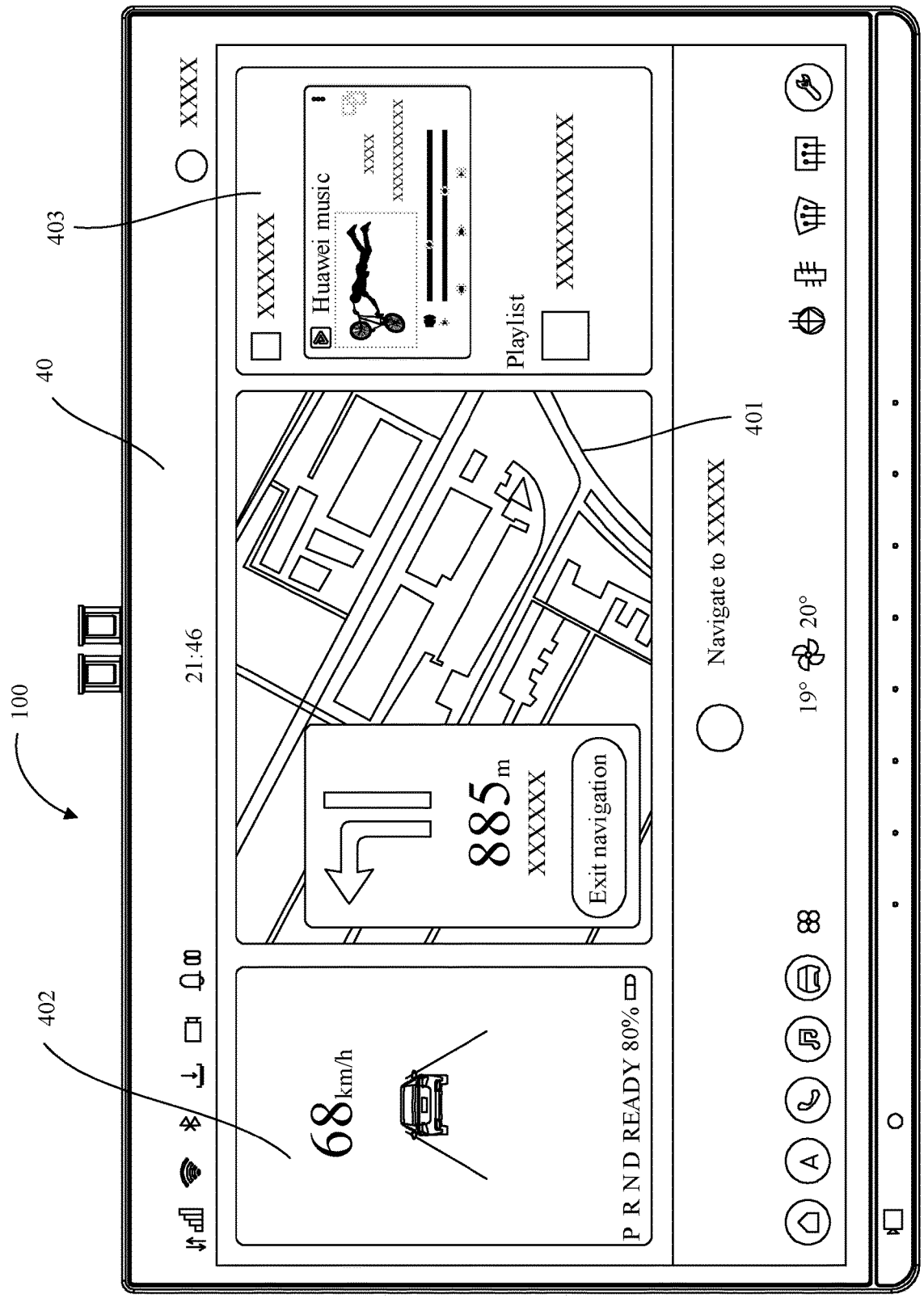
FIG. 17 is a schematic diagram of a vehicle-mounted electronic device according to an embodiment.

FIG. 17 is a separate accompanying drawing of the vehicle-mounted electronic device 100 shown in FIG. 16, and shows an example of a display picture of the vehicle-mounted electronic device 100. In this example, the display picture of the display unit 20 includes a navigation map display picture 401, a vehicle speed display picture 402 on a left side of the navigation map display picture 401, and a music playing picture 403 on a right side of the navigation map display picture 401.

A mode that can be implemented based on the camera module 42 is described above as an example. However, it is clear that another mode can be implemented based on lifting up and down and rotation characteristics (including separate lifting up and down and rotation, lifting up and down based on different groups and separate rotation, lifting up and down and rotation based on different groups, overall lifting up and down and separate rotation, overall lifting up and down and rotation based on different groups, and overall lifting up and down and rotation) of a single camera module/a plurality of camera modules.

It should be noted that the foregoing are merely examples of embodiments and applied technical principles of this disclosure. A person skilled in the art may understand that this disclosure is not limited to specific embodiments described herein. A person skilled in the art can make various obvious changes, adjustments, and replacements without departing from the protection scope of this disclosure. Therefore, although this disclosure is described in detail by using the foregoing embodiments, this disclosure is not limited to the foregoing embodiments, and may further include more equivalent embodiments without departing from the concept of this disclosure. All of the embodiments fall within the protection scope of this disclosure.

What is claimed is:

1. A vehicle-mounted electronic device comprising:
   a first housing;
   a first camera;
   a second camera;
   a lifting drive mechanism configured to:
      drive the first camera to be lifted up and moved down inside or outside the first housing; and
      drive the second camera to be lifted up and moved down inside or outside the first housing independently of the first camera; and
   a rotation drive mechanism configured to:
      drive the first camera to rotate; and
      drive the second camera to rotate independently of the first camera.

2. The vehicle-mounted electronic device of claim 1, further comprising a man-machine interface, wherein the lifting drive mechanism or the rotation drive mechanism is configured to execute driving in response to an instruction of the man-machine interface.

3. The vehicle-mounted electronic device of claim 2, wherein the man-machine interface comprises a voice interface, a touch interface, or a sensing interface.

4. The vehicle-mounted electronic device of claim 1, further comprising:
   a second housing; and
   a display mounted on the second housing.

5. The vehicle-mounted electronic device of claim 4, wherein the first housing is detachably mounted on the second housing.

6. The vehicle-mounted electronic device of claim 4, further comprising a microphone system comprising microphones arranged along an edge of the second housing.

7. The vehicle-mounted electronic device of claim 1, further comprising a millimeter-wave radar configured to perform liveness detection or gesture recognition.

8. The vehicle-mounted electronic device of claim 1, further comprising a near-field communication component configured to enable the vehicle-mounted electronic device to communicate with a mobile terminal.

9. The vehicle-mounted electronic device of claim 1, further comprising a haptic feedback component configured to generate haptic feedback for a touch operation.

10. The vehicle-mounted electronic device of claim 1, wherein the second camera is a depth camera, and wherein the first camera is a color camera.

11. A vehicle-mounted electronic device comprising:
    a first housing;
    a first camera;
    a lifting drive mechanism configured to drive the first camera to be lifted up and moved down inside or outside the first housing;
    a rotation drive mechanism configured to drive the first camera to rotate; and
    an optical proximity sensor configured to detect luminance in a vehicle cockpit.

12. The vehicle-mounted electronic device of claim 11, further comprising a second camera, wherein the lifting drive mechanism is further configured to drive the second camera to be lifted up and moved down inside or outside the first housing independently of the first camera, and wherein the rotation drive mechanism is further configured to drive the second camera to rotate independently of the first camera.

13. The vehicle-mounted electronic device of claim 11, further comprising:
    a second housing comprising an edge;
    a display mounted on the second housing; and
    a microphone system comprising microphones arranged along the edge.

14. A vehicle comprising:
    a vehicle-mounted electronic device comprising:
       a first housing;
       a second housing comprising an edge;
       a first camera;
       a lifting drive mechanism configured to drive the first camera to be lifted up and moved down inside or outside the first housing;
       a rotation drive mechanism configured to drive the first camera to rotate;
       a display mounted on the second housing; and
       a microphone system comprising microphones arranged along the edge.

15. The vehicle of claim 14, wherein the vehicle-mounted electronic device further comprises a man-machine interface, wherein the lifting drive mechanism or the rotation drive mechanism is configured to execute driving in response to an instruction of the man-machine interface.

16. The vehicle of claim 15, wherein the man-machine interface comprises a voice interface, a touch interface, or a sensing interface.

17. The vehicle of claim 14, wherein the vehicle-mounted electronic device further comprises a second camera, wherein the lifting drive mechanism is further configured to drive the second camera to be lifted up and moved down inside or outside the first housing independently of the first camera, and wherein the rotation drive mechanism is further configured to drive the second camera to rotate independently of the first camera.

18. The vehicle of claim 14, wherein the first housing is detachably mounted on the second housing.

19. The vehicle of claim 14, wherein the vehicle-mounted electronic device further comprises a millimeter-wave radar configured to perform liveness detection or gesture recognition.

20. The vehicle of claim 14, wherein the vehicle-mounted electronic device further comprises an optical proximity sensor configured to detect luminance in a vehicle cockpit.

* * * * *